United States Patent

Chimura et al.

(10) Patent No.: US 6,400,719 B1
(45) Date of Patent: Jun. 4, 2002

(54) TELEPHONE COMMUNICATION METHOD CAPABLE OF RELATING A TELEPHONE TERMINAL AND A SPEECH CHANNEL IP ADDRESS AT THE TIME OF CALL CONNECTION

(75) Inventors: Yasubumi Chimura; Masanori Goto; Mitsuo Endou; Toshikatsu Nakajima, all of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/084,246

(22) Filed: May 26, 1998

(30) Foreign Application Priority Data

May 26, 1997 (JP) .............................................. 9-135503

(51) Int. Cl.[7] .............................................. H04L 12/56
(52) U.S. Cl. ............................ 370/395.31; 370/395.54; 370/401
(58) Field of Search ................................. 370/352, 353, 370/354, 355, 356, 357, 360, 389, 392, 400, 401, 402, 403, 404, 405, 410, 395.2, 395.3, 395.31, 395.32, 395.5, 395.52, 395.54

(56) References Cited

U.S. PATENT DOCUMENTS

| | | | | |
|---|---|---|---|---|
| 5,351,237 A | * | 9/1994 | Shinohara et al. | 370/392 |
| 5,604,737 A | | 2/1997 | Iwami et al. | |
| 5,608,786 A | | 3/1997 | Gordon | |
| 5,610,910 A | | 3/1997 | Focsaneanu et al. | |
| 6,012,088 A | * | 1/2000 | Li et al. | 709/219 |
| 6,069,890 A | * | 5/2000 | White et al. | 370/352 |
| 6,075,783 A | * | 6/2000 | Voit | 370/352 |

FOREIGN PATENT DOCUMENTS

| | | |
|---|---|---|
| EP | 0 483 547 | 5/1992 |
| EP | 0 781 016 | 6/1997 |
| WO | WO 95/27942 | 10/1995 |
| WO | 97/23078 | 6/1997 |
| WO | WO 97/28553 | 8/1997 |
| WO | 97/28628 | 8/1997 |

OTHER PUBLICATIONS

Chiou I Y et al. "Gatenet: A Voice/Data Internet Transport System" Proceedings of the Annual Joint Conference Of The Computer And Communications Societies. (INFOCOM), US, Silver Spring, IEEE Comp. Soc. Press, vol. Conf. 5, 1986, pp. 39–46.

Sunshine C A: "Network Interconnection and Gateways" IEEE Journal On Selected Areas In Communications, US, IEEE Inc. New York, vol. 8, No. 1, 1990, pp. 4–11.

* cited by examiner

*Primary Examiner*—Kwang B. Yao
(74) *Attorney, Agent, or Firm*—Venable; Robert J. Frank; Michael A. Sartori

(57) ABSTRACT

A telephone communication method capable of promoting the efficient use of the limited number of IP (Internet Protocol) addresses is disclosed. When a call is originated on a first telephone terminal, a first gateway accommodating the terminal accesses a DNS (Domain Name System) server via a UDP (User Datagram Protocol) channel of Internet or Intranet. The first gateway inquires the DNS server of the IP address of a second gateway accommodating a telephone terminal to be called, using an office number assigned to the second telephone terminal as a host name. The DNS server returns the IP address of the second gateway to the first gateway via the UDP channel. In response, the first gateway selects its own IP address for speech transfer and sends a call connection request to the second gateway on a TCP (Transmission Control Protocol) channel of Internet. On receiving the request, the second gateway determines whether or not the second telephone terminal is busy, and selects the IP address for speech transfer if it is idle. The IP address selected is returned to the first gateway in the form of a response message. As a result, a connection is set up between the two telephone terminals.

6 Claims, 9 Drawing Sheets

| OFFICE NO. | HOST NAME | GW IP ADDRESS |
|---|---|---|
| 30 | TOKYO | 133.149.30.16 |
| 60 | OSAKA | 133.149.60.16 |

```
TOKYO    IN    133.149.30.16
OSAKA    IN    133.149.60.16

30       IN    CNAME    TOKYO
60       IN    CNAME    OSAKA
```

16

| OFFICE NO. | HOST NAME | GW IP ADDRESS |
|---|---|---|
| 30 | TOKYOPBX | 133.149.30.16 |
| 60 | OSAKAPBX | 133.149.60.16 |

```
TOKYOPBX    IN     133.149.30.16
OSAKAPBX    IN     133.149.60.16

30          IN     CNAME    TOKYOPBX
60          IN     CNAME    OSAKAPBX
```

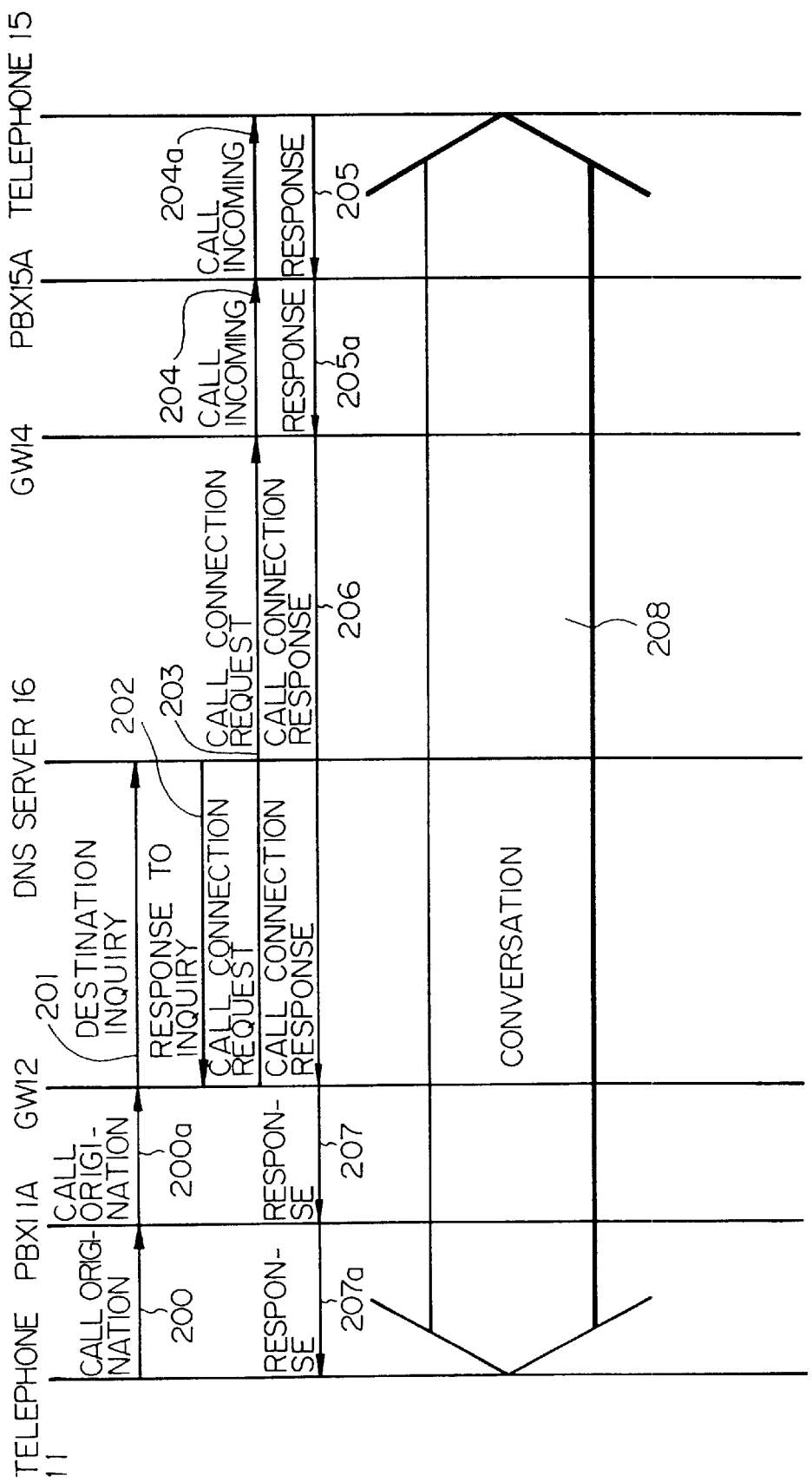

TELEPHONE COMMUNICATION METHOD CAPABLE OF RELATING A TELEPHONE TERMINAL AND A SPEECH CHANNEL IP ADDRESS AT THE TIME OF CALL CONNECTION

BACKGROUND OF THE INVENTION

1. Field of the Invention

The present invention relates to a telephone communication method for a communication system allowing a plurality of telephone terminals to communicate via Internet or Intranet (Private IP (Internet Protocol) Network).

2. Description of the Background Art

Speech communication systems implemented by Internet include an IRC (Internet Relay Chat) server system referred to as Internetphone. A conventional telephone communication system using the IRC server system accommodates a number of gateways capable of accessing Internet. Telephone terminals are connected t o each of the gateways via respective subscriber lines so as to allow conversation to be held therebetween. A number server is connected to Internet and assigns a particular IP (Internet Protocol) address to the telephone number of each telephone terminal for a control purpose.

Before a telephone connection, a gateway requests entry registration for a telephone service of the number server. In response to the request, the number server assigns a particular IP address to each telephone accommodated in the gateway, Assume that after the assignment of the IP addresses one of the telephone terminals accommodated in the gateway sends a call request meant for another telephone terminal to the gateway. Then, the gateway inquires of the number server an IP address assigned to the telephone to be called. In response, the number server searches for the above IP address and sends it to the gateway. The gateway having received the IP address sends a call connection request to a gateway accommodating the telephone terminal designated by the IP address. As a result, the call is terminated at the telephone terminal to be called. The called telephone terminal sends an answer representative of the call connection to the gateway accommodating the calling telephone terminal via the gateway accommodating the called telephone terminal. Consequently, the calling terminal and called terminal are connected together and allowed to communicate with each other.

The conventional telephone communication procedure described above has the following problems left unsolved. First, while a particular IP address must be assigned to each telephone terminal, communication will become difficult in the future because the number of IP addresses is limited and short throughout the world. Second, the communication system inhibits communication from being held on telephone terminals other than those registered at the number server, so that it is not available for emergency calls.

SUMMARY OF THE INVENTION

It is therefore an object of the present invention to provide a telephone communication method allowing a plurality of telephone terminals to share a single IP address and thereby promoting the efficient use of the limited number of IP addresses.

It is another object of the present invention to provide de a telephone communication method implementing a telephone communication system available even for emergency calls.

A telephone communication method of the present invention is applicable to a network system including a plurality of gateways given respective IP addresses corresponding to the addresses of Internet, which includes a control line having a first and a second channel and a speech line having a first and a second channel, for holding communication with each other via Internet on the basis of the IP addresses, and a plurality of telephone terminals given respective telephone numbers for holding communication with each other via the gateways on the basis of the telephone numbers. The method begins with the step of preparing a name server connectable to the gateways via Internet for managing the names of the gateways, IP addresses respectively corresponding to the names, and office numbers respectively assigned to the gateways.

When a first telephone terminal outputs a connection request meant for a second telephone terminal, a first gateway accommodating the first telephone terminal is caused to access the name server via the first channel of the control line in response to a call originated on the first telephone terminal, and inquire the name server of the IP address of the second gateway by using the name corresponding to the office number assigned to the second gateway. The name server sends the IP address of the second gateway to the first gateway on the first channel of the control line. The first gateway selects the IP address of the speech line connected thereto and sends a call connection request to the second gateway on the second channel of the control line. The second gateway determines whether or not the second telephone terminal is busy, selects, if the second telephone terminal is idle, the IP address of the speech line, and returns the IP address selected to the first gateway, thereby setting up a connection between the first telephone terminal and the second telephone terminal. The first gateway transfers a speech signal received from the first telephone terminal to the second gateway on the speech line, and causes the second gateway to send the speech signal to the second telephone terminal.

Also, a telephone communication method of the present invention is applicable to a network system including a plurality of gateways given respective IP addresses corresponding to the addresses of Internet, which includes a control line having a first and a second channel and a speech line having a first and a second channel, for holding communication with each other via internet on the basis of the IP addresses, a plurality of switching systems given respective office numbers for holding communication with each other via the gateways on the basis of the office numbers, and a plurality of telephone terminals given respective telephone numbers for holding communication with each other via the gateways and switching systems on the basis of the telephone numbers. The method begins with the step of preparing a name server connected to the gateways via Internet for managing office numbers and names respectively given to the switching systems and IP addresses assigned to the gateways to which the switching systems are respectively connected. Subscriber data tables each is stored in a respective one of the gateways and has a division field storing division data showing whether an apparatus accommodated in the respective gateway is the telephone terminal or the switching system, and an office number field storing an office number assigned to the gateway and an office number assigned to the switching system accommodated in the gateway.

When a first telephone terminal outputs a connection request meant for a second telephone terminal, a first gateway accommodating the first telephone terminal accesses the name server via the first channel of the control line in response to a call originated on the first telephone terminal and a call originated on a first switching system accommodating the first telephone terminal, and inquire the name server of the IP address of a second gateway accommodating a second switching system accommodating the second telephone terminal by using the name corresponding to the office number assigned to the second switching system. The name server sends the IP address of the second gateway to the first gateway on the first channel of the control line. The first gateway selects the IP address of the speech line connected thereto and sends a connection request to the second gateway on the second channel of the control line. The second gateway searches division data of the subscriber data and searches for, if the division data is representative of a switching system, the line of a switching system at which the office number of the second switching system and the office number included in the subscriber data coincide. The second gateway having detected the line of the switching system determines whether or not the line of the switching system is busy, selects, if the line is idle, the IP address of the speech line, and return the IP address selected to the first gateway, thereby setting up a connection between the first switching system and the second switching system and therefore between the first telephone terminal and the second telephone terminal. The first gateway transfers a speech signal received from the first telephone terminal via the first switching system to the second gateway via the speech line, and then the second gateway sends the speech signal to the second telephone terminal via the second switching system.

BRIEF DESCRIPTION OF THE DRAWINGS

The objects and features of the present invention will become more apparent from the consideration of the following detailed description taken in conjunction with the accompanying drawings in which:

FIG. 4 shows a specific format of number conversion information stored in a DNS (Domain Name System) server also included in the embodiment of FIG. 1;

FIG. 10 is a chart demonstrating a specific communication sequence available with the embodiment shown in FIG. 7.

DESCRIPTION OF THE PREFERRED EMBODIMENTS

Figure 1:
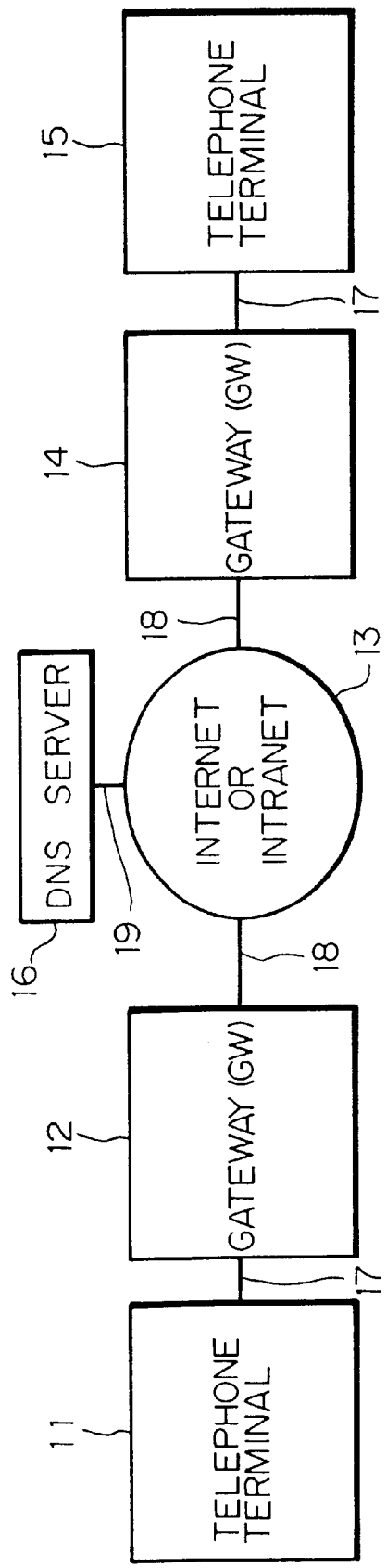
FIG. 1 is a block diagram schematically showing a telephone communication system to which a telephone communication method embodying the present invention is applied.

Referring to FIG. 1 of the drawings, a telephone communication system implemented by a telephone communication method embodying the present invention includes gateways (GW) 12 and 14 connected to Internet or Intranet 13 by respective connection lines 18 so as to access it, as needed. It should be noted that, for simplicity in FIG. 1 the two gateways 12 and 14 are representative of a number of gateways included in the communication system for simplicity. The gateways 12 and 14 respectively accommodate telephone terminals 11 and 15 connected thereto by subscriber lines 17. In FIG. 1, the two telephone terminals 11 and 15 are each representative of a number of telephone terminals connected to the gateway 12 or 14. That is, the illustrative embodiment is, of course, applicable to a telephone communication system including other gateways and other telephone terminals.

The gateway 12 converts an analog speech signal received from the telephone terminal 11 to a corresponding digital signal or converts a digital signal received via Internet or Intranet 13 to a corresponding analog signal and delivers the analog signal to the terminal 11. In addition, the gateway 12 executes various kinds of control over connections to occur via Internet or Intranet 13. The gateway 14 has exactly the same functions as the gateway 12 except that it deals with the telephone terminal 14. The gateways 12 and 14 may have an identical configuration as will be described later with reference to FIG. 2.

Figure 2:
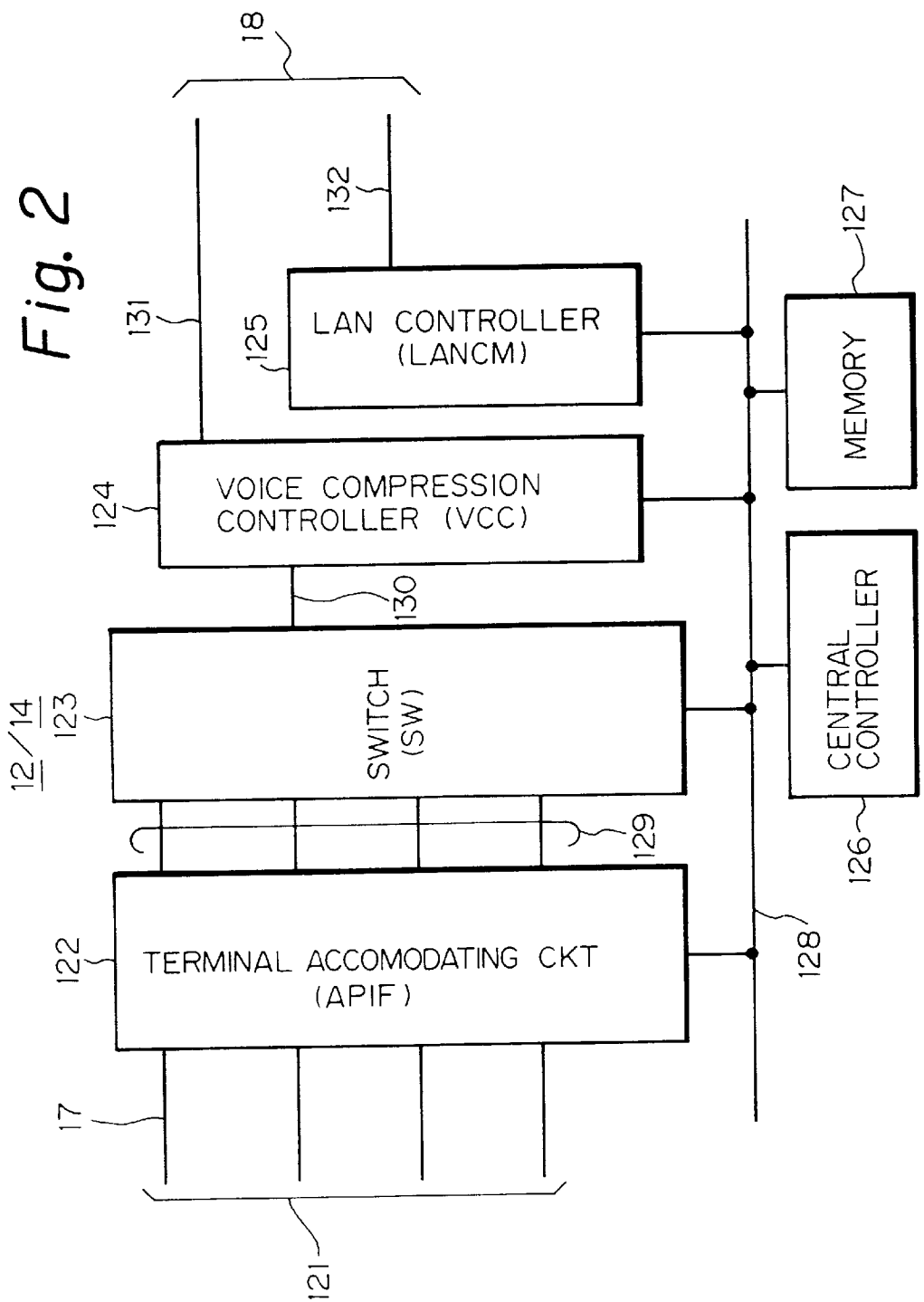
FIG. 2 is a block diagram schematically showing a specific configuration of a gateway included in the embodiment shown in FIG. 1.

A DNS server or similar name server 16 is also connected to Internet or Intranet 13. The DNS server 16 has an address mapping function for managing correspondence between host names assigned to various hosts including the telephone terminals 11 and 15, gateways 12 and 14 and computers, not shown, and IP addresses. For this purpose, the DNS server 16 includes a memory, not shown, storing data representative of correspondence between the host names and the IP addresses in the form of a table FIG. 2 shows a specific configuration of the gateway 12 or 14. The following description will concentrate mainly on the gateway 12. As shown, the gateway 12 or 14 includes a terminal accommodating circuit (Analog Peripheral Interface or APIF) 122. A group of lines including the lines to which the telephone terminal 11 or 15 is connected are connected to the input ports of the terminal accommodating circuit 122. The circuit 122 interfaces the group of lines 121 and the gateway 12 or 14. The circuit 122 has its output ports 129 connected to the input ports of a switch (SW) 123. The switch 123 selects one of the lines 121 at a time and connects it to its output port 130 which is connected to a voice compression controller (VCC) 124. The voice compression controller 124 compresses a speech signal and then delivers it to a line 131 connected to Internet or Intranet 13, or reproduces a speech signal from a signal received from another gateway, as needed. The connection line 131 connected to the voice compression controller 124 is exclusively assigned to digital speech signals to be interchanged via Internet or Intranet 13.

The gateway 12 further includes a LAN (Local Area Network) controller (LACM) 125 for sending various control signals particular to Internet or Intranet 13 to Internet or Intranet 13. Specifically, a control line 132 is connected to the LAN controller 125 in order to allow control information to be sent via Internet or Intranet 13. The gateway 12 or 14 additionally includes a central controller 126 for controlling call connections, and a memory 127 for storing number conversion information, which will be described, under the control of the central controller 126. The terminal accommodating circuit 122, switch 123, speech compression controller 124, LAN controller 125, central controller 126 and memory 127 are interconnected by a bus 128, as illustrated.

Figure 3:
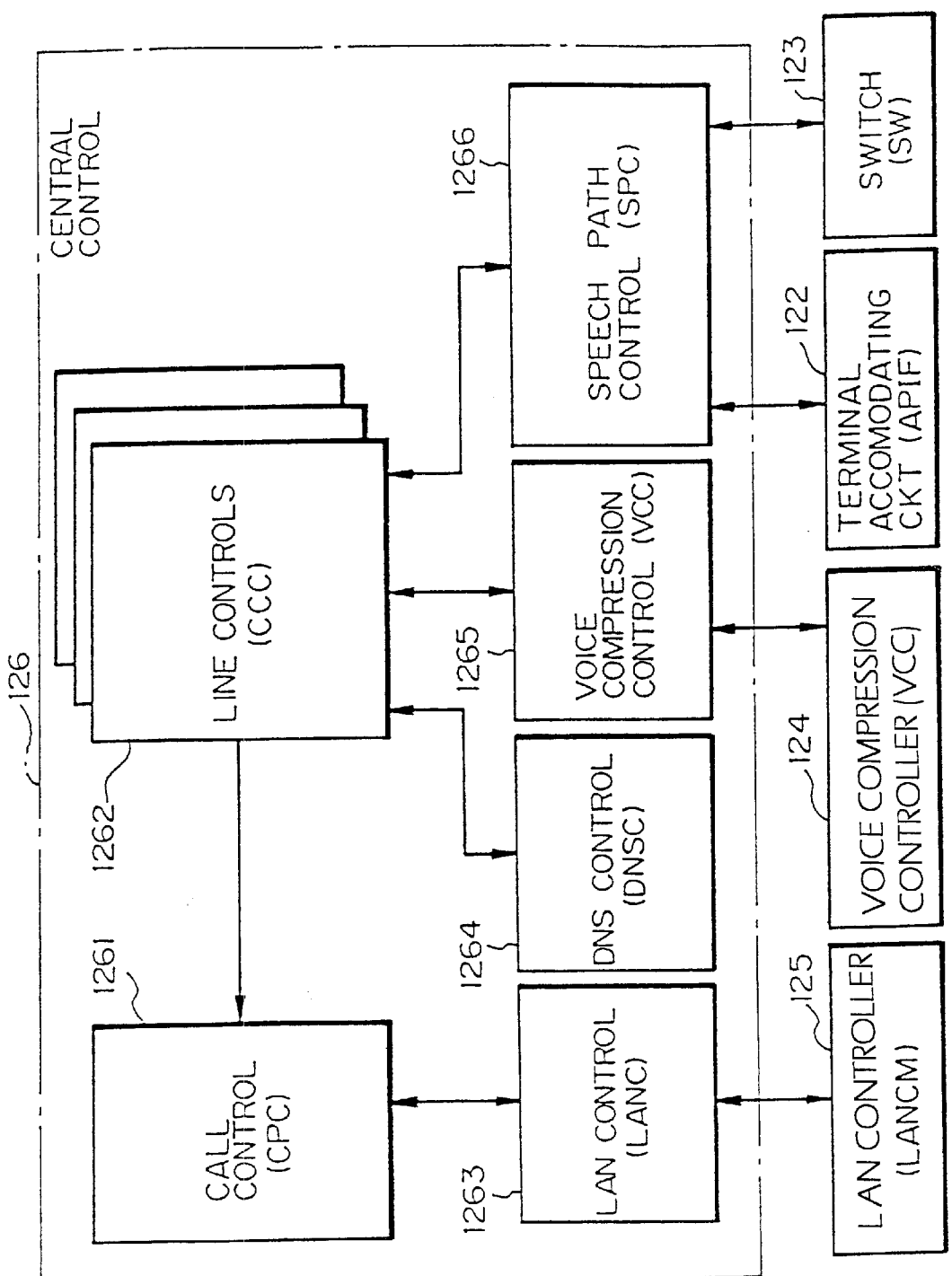
FIG. 3 is a block diagram schematically showing a specific configuration of a central controller included in the gateway of FIG. 2.

FIG. 3 shows a specific configuration of the central controller 126 for implementing the gateway control function. As shown, the central controller 126 includes a call control (CPC) 1261 for processing call connections between a source apparatus and a destination apparatus, e.g., between the gateways 12 and 14 and therefore between the telephone terminals 11 and 15. Line controls (CCC) 1262 are connected to the call control 1261, as illustrated. The line controls 1262 execute the line-by-line access of the gateway 12 or 14 to the DNS server 16 and commands voice compression and control over a speech path. A LAN control (LAC) 1263 is also connected to the call control 1261, as illustrated. The LAN control 1263 controls the LAN controller 125 in order to interchange control information via Internet or Intranet 13.

A DNS control (DNSC) 1264, a voice compression control (VCC) 1265 and speech path control (SPC) 1266 are connected to the line control 1262, as illustrated. The DNS control 1264 controls number inquiry to the DNS server 16. The voice compression control 1265 controls the compression and reproduction of speech signals to be executed by the speech compression controller 124. The speech path control 1266 controls the terminal accommodating circuit 122 and switch 123 in order to selectively set up or interrupt the connection path between the telephone terminals 11 and 15 and the connection path between the terminal 11 and the voice compression controller 124.

FIG. 4 shows specific number conversion information stored in the DNS server 16 of the illustrative embodiment. The number conversion information are based on rules prescribed by RFC (Request For Comments) 1034 (Domain Names—Concepts and Facilities). In FIG. 4, the gateways 12 and 14 are assumed to be respectively located in Tokyo and Osaka, Japan, and respectively provided with office numbers of "30" and "60". In addition, the gateways 12 and 14 are provided with host names "TOKYO" and "OSAKA", respectively. The control lines 132 of Internet 13 connected to the gateways 12 and 14, respectively, are provided with IP addresses "133. 149. 30. 16" and "133. 149. 60. 16", respectively. In this specific case, the IP addresses are respectively related to the host names first, and then the office numbers "30" and "60" are respectively assigned to the host names as double definition, i.e., CNAMEs (Canonical Names).

Figure 5:
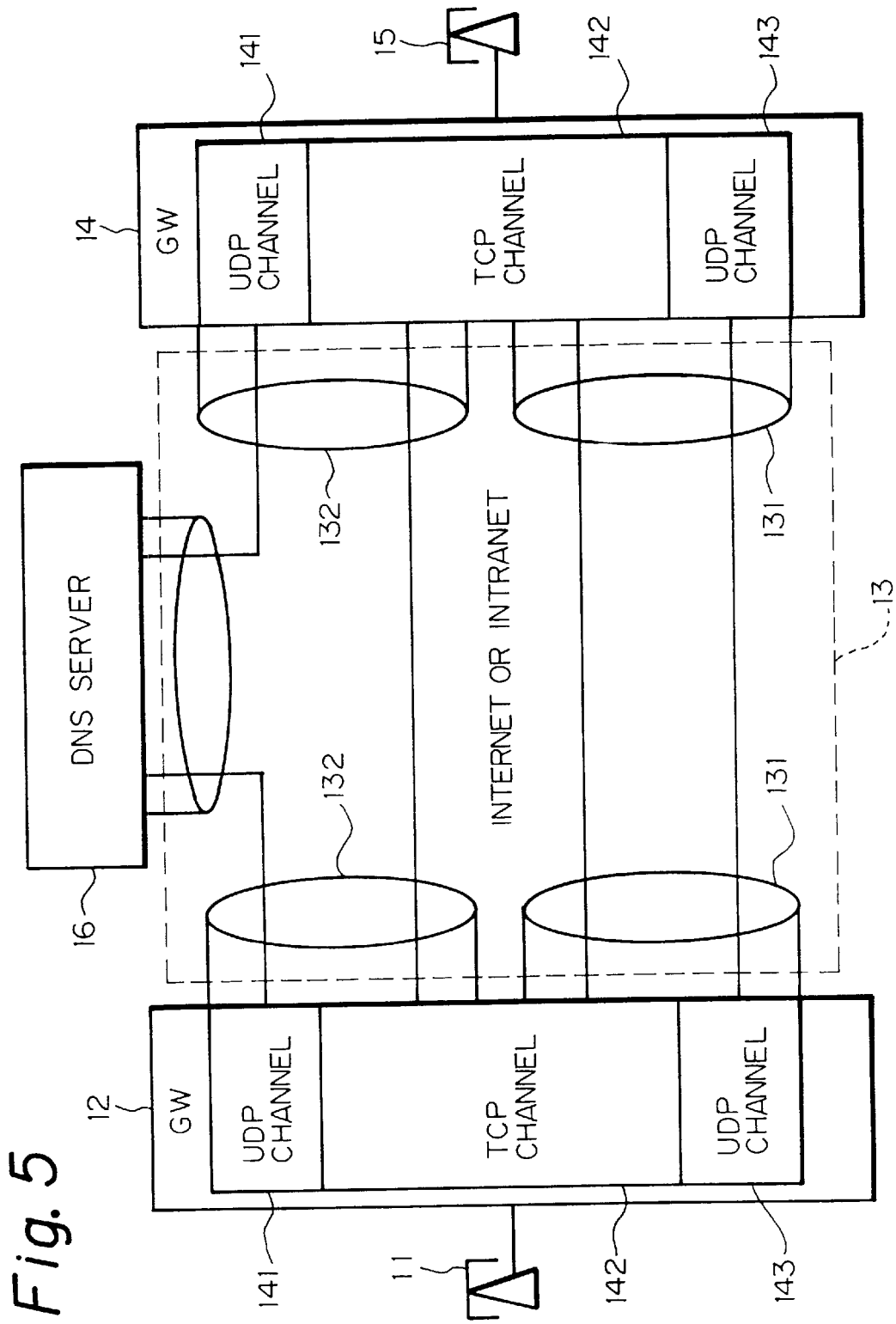
FIG. 5 is a view useful for understanding channels included in Internet and used by the embodiment of FIG. 1.

Specific channels available with Internet or Intranet 13 will be described with reference to FIG. 5. As shown, the gateways 12 and 14 are each capable of accessing the DNS server 16 via a UDP (User Datagram Protocol) channel 141 included in the respective control line 132 belonging to Internet or Intranet 13. The DNS server 16 provides, e.g., the gateway 12 with the office number, host name and IP address of, e.g., the gateway 14. Then, the gateway 12 confirms the status of the telephone terminal designated by the office number, host name and IP address, i.e., the telephone terminal 14 via a TCP (Transmission Control Protocol) channel 142 included in the associated control line 132. At the same time, the gateway 12 selects an IP address assigned to the speech line 131 belonging to Internet or Intranet 13. As a result, a speech signal is sent via a UDP channel 143 on the IP address of the speech line 131 selected. When the gateway 12 sends a speech signal via the UDP channel 143, it cannot confirm its connection to the destination telephone terminal 15. For this reason, the gateway 12 monitors the UDP channel 143 via the TCP channel 142 of the same address as the channel 143. In this manner, at the time of call connection, the illustrative embodiment relates the telephone terminal 15 and the IP address of the UDP channel 143 to each other. This obviates the need for the conventional assignment of a particular IP address to each telephone terminal.

Figure 6:
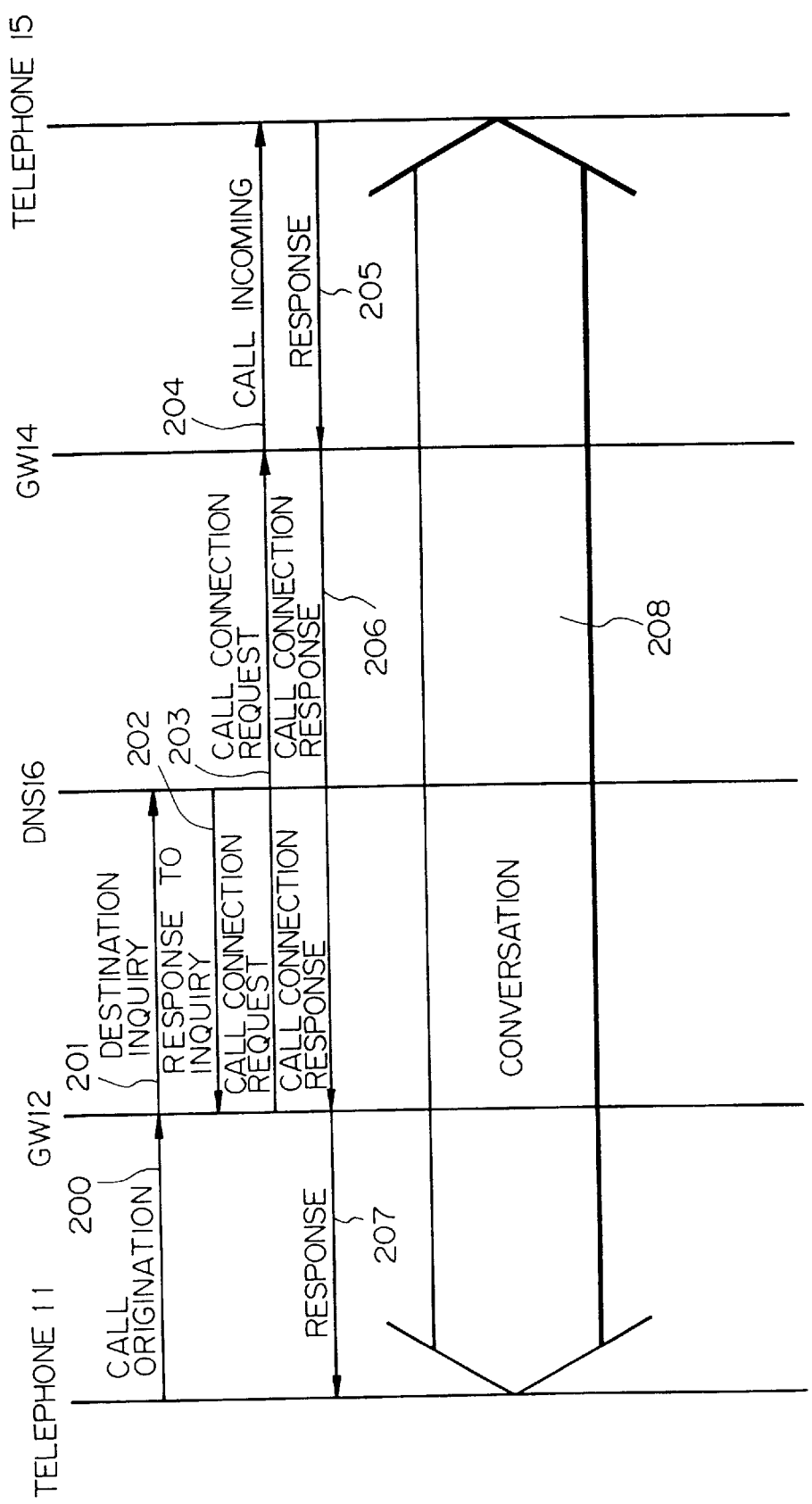
FIG. 6 is a chart representative of a specific communication sequence available with the embodiment of FIG. 1.

FIG. 6 demonstrates a specific communication sequence available with the illustrative embodiment. How telephone communication is held in the above system will be described with reference to FIG. 6.

(1) Destination Address Inquiry

Assume that the telephone terminal 11 located in Tokyo outputs a connection request meant for the telephone terminal 15 located in Osaka. In response to call origination 200 on the telephone terminal (source hereinafter) 11, the gateway 12 causes its central controller 126 to control the LAN controller 125 in order to access the DNS server 16 via the UDP channel 141 of the control line 132. Specifically, the LAN controller 125 inquires of the DNS server 16 the IP address of the gateway 14 to be called, using the host name corresponding to the office number of the gateway 14 accommodating the telephone terminal to be called (destination hereinafter) 15. This is represented by a flow 201.

(2) Response to Inquiry

In response to the inquiry 201, the DNS server 16 searches its table listing the correspondence between the host names and IP addresses, using the host name "OSAKA". In this case, the DNS server 16 reads the IP address "133. 149. 60. 16" assigned to the gateway 14 to be called out of the table and returns it to the LAN controller 125 of the gateway 12 over the UDP channel 141 of the control line 132. Such a response of the DNS server 16 is represented by a flow 202.

(3) Call Connection Request

On receiving the response 202, the LAN controller 125 of the gateway 12 designates the IP address of the gateway 14 on the speech line 131 under the control of the central controller 126. Then, the LAN controller 125 sends a call connection request 203 to the gateway 14 over the TCP channel 142 of the control line 132 having the above IP address, (4) Connection Response In response to the connection request 203, the central controller 126 of the called gateway 14 determines whether or not the destination 15 is busy. If the destination 15 is busy, then the central controller 126 returns a message representative of the busy state to the calling gateway 12. This message is transferred to the call control 1261 of the calling gateway 12 via the LAN controller 125 and the LAN control 1263 of the central controller 126. On the other hand, if the destination 15 is idle, the central controller 126 of the called gateway 14 causes the destination 15 to ring or otherwise display a call incoming 204. When a person at the telephone terminal 15 off-hooks the terminal 15 to answer the phone, the central controller 126 of the called gateway 14 detects the response 205 and then selects the IP address of the speech line 131. The IP address selected is sent to the calling gateway 12 in the form of a response message 206. In the calling gateway 12, the call control 1261 receives the response message 206. As a result, a response 207 representative of the response from the destination 15 is sent to the source 11 in order to set up call connection between the source 11 and the destination 15.

(5) Conversation

As a speech signal is sent from the source 11 to the calling gateway 12, the speech compression circuit 124 of the gateway 12 compresses the speech signal under the control of the central controller 126. The compressed speech signal is sent from the calling gateway 12 to the called gateway 14 on the speech channel of the speech line 131, i.e., the UDP channel 143. In the called gateway 14, the voice compression controller 124 reproduces an analog speech signal from the compressed speech signal and sends it to the destination 15. A speech signal is sent from the destination 15 to the source 11 in exactly the same way. In this manner, conversation 207 is held between the source 11 and the destination Advantages achievable with the illustrative embodiment are as follows. At the time of call connection, a telephone terminal and the IP address of a UDP channel for speech transfer are related to each other first. It is, therefore, not necessary to assign a particular IP address to each telephone terminal by use of the entry registration principle. This allows a plurality of terminals to share a single IP address and thereby promotes the efficient use of the limited number of IP addresses. Further, because telephone terminals do not have to be registered at a DNS server, they can be used for emergency calls. In addition, speech communication can be implemented by a DNS server customarily connected to a data network, i.e., without resorting to a special address server.

Figure 7:
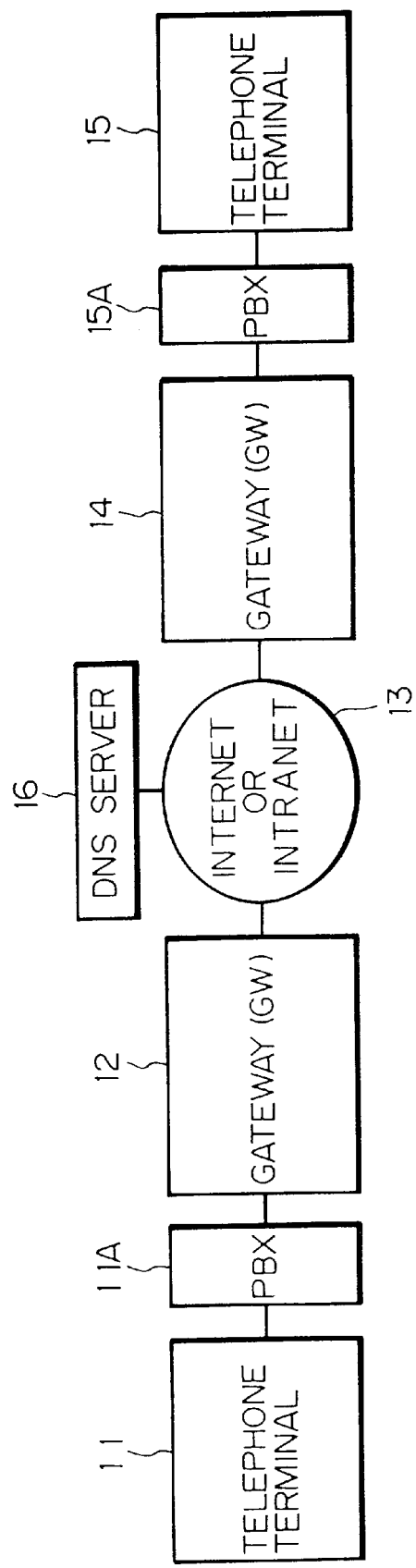
FIG. 7 is a block diagram similar to FIG. 1, schematically showing a telephone communication system to which an alternative embodiment of the present invention is applied.

Referring to FIG. 7, an alternative embodiment of the present invention will be described. In FIG. 7, reference numerals identical with the reference numerals shown in FIG. 1 denote like structural elements. As shown, this embodiment differs from the previous embodiment in that private branch exchanges (PBXs) or switching systems 11A and 15A are respectively connected between the telephone terminal 11 and the gateway 12 and between the telephone terminal 15 and the gateway 14. As for the rest of the construction, this embodiment is identical with the previous embodiment.

Figures 8, 9:
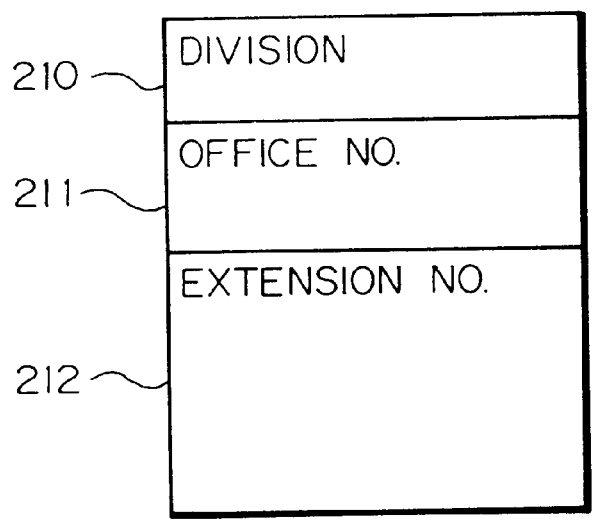
FIG. 8 is a view similar to FIG. 4, showing a specific number conversion information particular to the embodiment shown in FIG. 7.
FIG. 9 shows a specific format of subscriber data also particular to he embodiment shown in FIG. 7.

In this embodiment, the DNS server 16 stores number conversion information in a specific format shown in FIG. 8. As shown, the gateways 12 and 14 accommodating the PBXs 11A and 15A, respectively, are assumed to be located in Tokyo and Osaka, respectively. In the illustrative embodiment, the office numbers "30" and "60" are assigned to the PBXs 11A and 15A, respectively. Also, host names "TOKYOPBX" and "OSAKAPBX" are given to the PBXs 11A and 15A, respectively. The IP addresses of the control lines 132 of Internet or Intranet 13 connected to the gateways 12 and 14, respectively, are "133. 149. 30. 16" and "133. 149. 60. 16", respectively. In this specific case, such IP addresses are respectively related to the host names first, and then the PBX office numbers are respectively assigned to the host names as double definition, i.e., CNAMEs.

The gateways 12 and 14 each stores subscriber data. In the illustrative embodiment, the subscriber data are stored in the memories 127 of the gateways 12 and 14 in a specific format shown in FIG. 9. As shown, the format is made up of a division field 210, an office number field 211, and an extension number field 212. In the division field 210, a (logical) ZERO is set if the apparatus accommodated in the gateway 12 or 14 is an extension, or a. (logical) ONE is set if it is a private branch exchange. In the office number field 211, the office number assigned to the gateway 12 or 14 is set if the apparatus set in the division field 210 is an extension, or the office number assigned to a private branch exchange is set if it is a private branch exchange. Further, in the extension number field 212, an extension number is set if the apparatus set in the division field 210 is an extension.

A specific telephone communication sequence available with the system shown in FIG. 7 will be described with reference to FIG. 10.

(1) Destination Inquiry

Assume that the telephone terminal (source hereinafter) 11 in Tokyo outputs a connection request 200 meant for the telephone terminal (destination hereinafter) 15 in Osaka. In response, the PBX 11A accommodating the source 15 sends a call 200a to the gateway 12. In response, in the gateway 12, the LAN controller 125, FIG. 2, accesses the DNS server 16 via the UDP channel 141 of the control line 132, FIG. 5, under the control of the central controller 126, FIG. 2. The LAN controller 125 inquires the DNS server 16 of the IP address of the gateway 14 accommodating the PBX 1SA, using the host name "OSAKAPBX" corresponding to the office number of the destination 15 (flow 201). This is followed by the response-to-call procedure (2) and call connection request procedure (3) described previously with reference to FIG. 6.

Specifically, the DNS server 16 searches for the IP address of the called gateway 14 and returns it to the calling gateway 12. I n response, the gateway 12 designates the IP address of the gateway 14 on the speech line 131, FIG. 5, and then sends a call connection request 203 to the gateway 14 on the TCP channel 142, FIG. 5, of the control line designated by the above IP address.

(4) Search

On receiving the call connection request 203, the called gateway 14 causes its central controller 126 to search the subscriber data stored in the memory 127. The central controller 126 determines the kind of an apparatus set in the division field 210 of the subscriber data searched for. If the apparatus is a private branch exchange, then the controller 126 identifies the line of a private branch exchange whose office number ("60" in this case) is identical with the data stored in the office number field 211 of the subscriber data 127.

(5) Connection Response

In the called gateway 14, the central controller 126 having detected the line to the PBX 1SA determines whether or not the PBX line is busy. If the PBX line is busy, then the central controller 126 returns a message representative of the busy state to the calling gateway 12. If the PBX line is idle, then the central controller 126 of the called gateway 14 causes the PBX 1SA and destination 15 to display a call incoming 204 and a call incoming 204a, respectively. When a person at the destination off-hooks the telephone terminal 15 to answer the phone, the terminal 15 and PBX 15A respectively return responses 205 and 205a to the called gateway 14. The central controller 126 of the called gateway 14 detects the response 205a and then selects the IP address of the speech line 131. The IP address selected is sent to the calling gateway 12 in the form of a response message 206. In the calling gateway 12, the call control 1261 receives the response message 206. As a result, a response 207 representative of the response from the destination 15 is sent to the PBX 11A which, in turn, sends a response 207a to the source 11 in order to set up call connection between the source 11 and the destination 15.

(6) Conversation

As a speech signal is sent from the source 11 to the calling gateway 12 via the PBX 11A, the speech compression circuit 124 of the gateway 12 compresses the speech signal under the control of the central controller 126. The compressed speech signal is sent from the calling gateway 12 to the called gateway 14 on the speech channel of the speech line 131, i.e., the UDP channel 143. In the called gateway 14, the voice compression controller 124 reproduces an analog speech signal from the compressed speech signal and sends it to the destination 15 via the PBX 15A. A speech signal is sent from the destination 15 to the source 11 in exactly the same way. In this manner, conversation 208 is held between the source 11 and the destination 15.

As stated above, in the illustrative embodiment, the DNS server 16 manages office numbers respectively assigned to the PBXs 11A and 15A, names respectively given to the PBXs 11A and 15A, and IP addresses respectively assigned to the gateways 12 and 14 accommodating the PBXs 11A and 15A, respectively. The gateways 12 and 14 each stores the subscriber data table 127 for managing the subscriber data including the division field 210 and office number field 211. The division field 210 stores data showing whether an apparatus accommodated is a telephone terminal or an exchange. The office number field 211 stores the office number of the gateway 12 or 14 and the office number of the associated PBX 11A or 15A. With this configuration, the embodiment advantageously implements speech communication using Internet 13 not only via a telephone terminal but also via a private branch exchange belonging to a telephone network. Of course, it is not necessary for both of a source and a destination to communicate via respective private branch exchanges.

In a conventional system of the type including private branch exchanges respectively accommodated by the calling gateway 12 and called gateway 14, it is necessary to register the telephone numbers of telephone terminals at the associated gateways, i.e., to set identical subscriber data in both of each exchange and gateway associated therewith. By contrast, the illustrative embodiment should only store the subscriber data in the memory of each gateway and therefore promotes simple processing.

In summary, it will be seen that the present invention provides a telephone communication method capable of relating a telephone terminal and the IP address of a speech transfer channel to each other. This obviates the need for the conventional assignment of a particular IP address to each telephone terminal and allows a plurality of telephone terminals to share a single IP address. Therefore, the method of the invention promotes the efficient use of the limited number of IP addresses. In addition, the method of the invention allows a telephone communication system using Internet to be used for emergency calls because it does not register telephone terminals at a name server.

The entire disclosure of Japanese patent application No. 13550311997 filed on May 26, 1997 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A telephone communication method for a network system including a plurality of gateways given respective IP addresses corresponding to addresses of Internet or Intranet, which includes a control line having a first and a second channel and a speech line having a first and a second channel, for holding communication with each other via Internet or Intranet on the basis of said IP addresses, a plurality of switching systems given respective office numbers for holding communication with each other via said plurality of gateways on the basis of said office numbers, and a plurality of telephone terminals given respective telephone numbers for holding communication with each other via said plurality of gateways and said plurality of switching systems on the basis of said telephone numbers, said telephone communication method comprising the steps of:

preparing a name server connected to said plurality of gateways via Internet or Intranet for managing office numbers and names respectively given to said plurality of switching systems and IP addresses assigned to said plurality of gateways to which said switching systems are respectively connected;

preparing subscriber data tables each being stored in a respective one of said plurality of gateways and having a division field storing division data showing whether an apparatus accommodated in the respective gateway is the telephone terminal or the switching system, and an office number field storing an office number assigned to said gateway and an office number assigned to the switching system accommodated in said gateway;

causing, when a first one of said plurality of telephone terminals outputs a connection request meant for a second one of said telephone terminals, a first one of said plurality of gateways accommodating said first telephone terminal to access said name server via the first channel of the control line in response to a call originated on said first telephone terminal and a call originated on a first one of said plurality of switching systems accommodating said first telephone terminal, and inquire of said name server the IP address of a second one of said gateways accommodating a second one of said plurality of switching systems accommodating said second telephone terminal by using the name corresponding to the office number assigned to said second switching system;

causing said name server to send the IP address of said second gateway to said first gateway on the first channel of the control line;

causing said first gateway to select the IP address of the speech line connected thereto and send a connection request to said second gateway on the second channel of the control line;

causing said second gateway to search division data of said subscriber data and search for, if said division data is representative of a switching system, a line of a switching system at which the office number of said second switching system and the office number included in said subscriber data coincide;

causing said second gateway having detected said line of said switching system to determine whether or not said line of said switching system is busy, select, if said line is idle, the IP address of the speech line, and return the IP address selected to said first gateway, thereby setting up a connection between said first switching system and said second switching system and between said first telephone terminal and said second telephone terminal; and causing said first gateway to transfer a speech signal received from said first telephone terminal via said first switching system to said second gateway via the speech line, and causing said second gateway to send the speech signal to said second telephone terminal via said second switching system.

2. A telephone communication method in accordance with claim 1, wherein each of the first channels includes a UTDP channel of Internet while each of the second channels includes a TCP channel of Internet.

3. A method for initiating a call from a first telephone terminal to a second telephone terminal via a network, comprising the steps of:

receiving a call origination from a first switching system coupled to said first telephone terminal;

forwarding a destination inquiry to a name server via a first channel of a control line and said network to obtain a network address of a second gateway servicing a second switching system coupled to said second telephone terminal, said name server maintaining a database of gateways and network addresses;

receiving a response to inquiry from said name server via said first channel of said control line and said network, said response to inquiry comprising said network address of said second gateway;

forwarding a call connection request to said second gateway via a second channel of said control line and said network using said network address of said second gateway, said second gateway maintaining a subscriber data table comprising a division field and an office number field, said division field indicating whether an apparatus coupled to said second gateway is a telephone terminal or a switching system, said office number field indicating an office number corresponding to a telephone terminal as indicated in said division field and an office number corresponding to a switching system as indicated in said division field;

receiving a call connection response from said second gateway via said network, said call connection response comprising a network address of a speech line for said second switching system, said speech line identified from said subscriber data table; and forwarding a response to said first switching system regarding a call connection between said first telephone terminal and said second telephone terminal.

4. A method as in claim 3, wherein said first channel of said control line comprises a UDP channel of Internet and said second channel of said control line comprises a TCP channel of Internet.

5. A method for initiating a call from a first telephone terminal to a second telephone terminal via a network, comprising the steps of:

receiving a call connection request from a first gateway via a second channel of a control line and said network, said first telephone terminal coupled via a first switching system to said first gateway, said call connection request using a network address provided by a network server coupled to said network;

searching a subscriber data table to identify a switching line of a second switching system coupled to said second telephone terminal, said subscriber data table comprising a division field and an office number field, said division field indicating whether an apparatus is a telephone terminal or a switching system, said office number field indicating an office number corresponding to a telephone terminal as indicated in said division field and an office number corresponding to a switching system as indicated in said division field;

forwarding a call incoming to said second switching system and said second telephone terminal if said switching line is idle;

receiving a response from said second switching system and said second telephone terminal if said second telephone terminal is answered;

selecting a network address for a speech line for said second switching system; and forwarding a call connection response to said first gateway via said network, said call connection response comprising said network address for said speech line for said second switching system.

6. A method as in claim 5, wherein said second channel of said control line comprises a TCP channel of Internet.

* * * * *